United States Patent

Ross

[15] 3,649,848

[45] Mar. 14, 1972

[54] VOLTAGE TRANSLATION CIRCUIT FOR MNOS MEMORY ARRAY

[72] Inventor: Edward Charles Ross, Hightstown, N.J.

[73] Assignee: RCA Corporation

[22] Filed: Dec. 3, 1970

[21] Appl. No.: 94,884

[52] U.S. Cl. ..........................307/251, 307/205, 340/173 R

[51] Int. Cl. ..........................H03k 17/60

[58] Field of Search ..........................340/173 FF, 173 R; 307/205, 307/208, 238, 251, 242, 279, 270

[56] References Cited

UNITED STATES PATENTS

| | | | |
|---|---|---|---|
| 3,386,053 | 5/1968 | Priddy | 307/251 X |
| 3,449,594 | 6/1969 | Gibson et al. | 307/205 X |
| 3,500,062 | 3/1970 | Annis | 307/216 |

*Primary Examiner*—Stanley M. Urynowicz, Jr.
*Attorney*—H. Christoffersen

[57] ABSTRACT

A plurality of switches such as metal-oxide-semiconductor (MOS) field-effect transistors interconnected to produce appropriate voltage levels for operating a metal-nitride-oxide-semiconductor (MNOS) memory. In response to a word line selection voltage, the switches apply to a selected word line a voltage which: is equal to, is the logical complement of, or is of a value between these levels, on the line selection voltage, depending upon whether a write, clear or read operation is called for, respectively.

5 Claims, 3 Drawing Figures

INVENTOR.
Edward C. Ross
BY
[signature]
ATTORNEY

INVENTOR.
Edward C. Ross
BY
ATTORNEY

VOLTAGE TRANSLATION CIRCUIT FOR MNOS MEMORY ARRAY

STATEMENT

The invention described herein was made in the course of or under a contract or subcontract thereunder with the Department of the Air Force.

SUMMARY OF THE INVENTION

A low impedance path is connected between an input and an output terminal in response to a first control voltage. This path is opened and the logical complement of the voltage present at the input terminal is applied to the output terminal in response to the presence of a second control voltage and the absence of the first control voltage. In response to the presence of a third control voltage and the absence of the first and second control voltages, a first path is provided between the two terminals and a second path is placed between the output terminal and a point of reference potential, the relative impedances of said paths being such as to provide a voltage at a desired level at said output terminal in response to a voltage at said input terminal.

DETAILED DESCRIPTION

Figure 1:
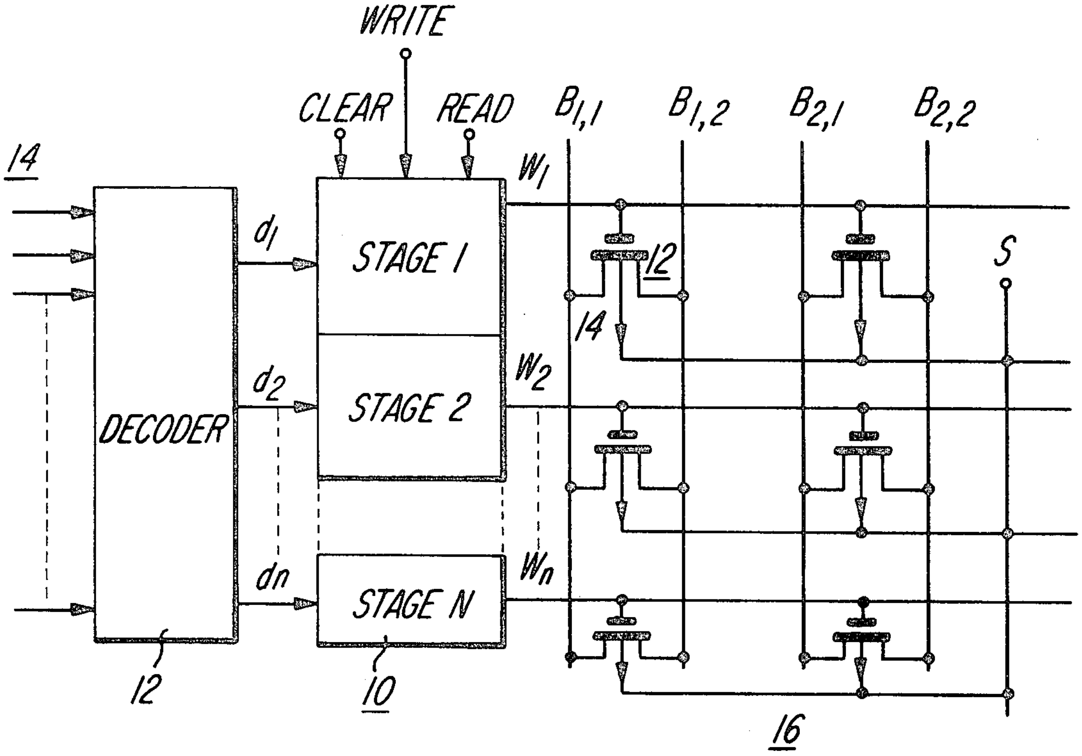
FIG. 1 is a block and schematic circuit diagram of a portion of a memory system which includes the present invention.

The present invention resides in circuits within block 10 of FIG. 1. However, in order to better understand the operating characteristics of the circuit and the reason such a circuit is needed, the entire system of FIG. 1 and the requirements for operating the system are discussed first.

The system of FIG. 1 includes a decoder 12 which may have $m$ input lines 14, each carrying a signal which represents the binary digit (bit) 1 or 0. The decoder translates this $m$ bit word to a 1-out-of-$n$ code. In other words, of the $n$ output lines $d_1$, $d_2$, . . . $d_n$, one of these lines carries a signal −V which represents the bit 1 and the remaining lines are at ground level representing the bit 0.

The voltage translating circuit 10 of the present invention includes $n$ identical stages, one of which is illustrated in schematic form in FIG. 3 and is discussed later. The purpose of a stage is to translate the voltage level −V, when it is present on the $d$ line for that stage, to a voltage level which it applies to the corresponding word line $w$ of the memory 16, which is suitable for writing, reading or clearing a row of the memory. Each stage receives, in addition to a $d$ signal, a clear, or a write, or a read signal. The way in which these signals affect the operation of a stage in the translator 10 is discussed in greater detail later in the discussion of FIG. 3.

The memory 16 has n row or word lines $w_1$, $w_2$, . . . $w_n$, only three of which are shown, and $p$ columns, only two of which are shown. Each column of the memory has two conductors such as $B_{1,1}$ and $B_{1,2}$. There is a memory device, a P-type MNOS transistor, at each column-row intersection. Each such device is similarly connected to its column and row leads. For example, the device 12 is connected at its source to column conductor $B_{1,1}$ at its drain to column conductor $B_{1,2}$ and at its gate to word conductor $w_1$. As is now well understood in this art, the memory shown is an integrated circuit memory and the substrate, which is common to all of the memory elements, is illustrated by a line with an arrow such as 14.

Figure 2:
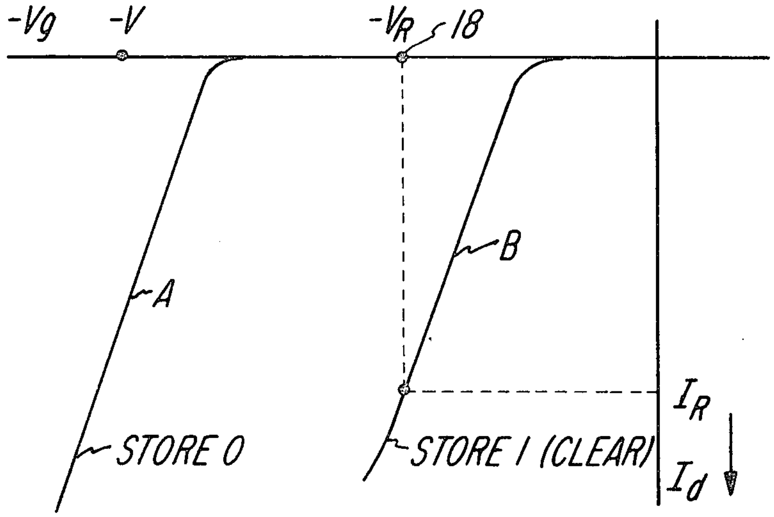
FIG. 2 is a graph illustrating the operating characteristics of an MNOS memory device of FIG. 1.

The operating characteristics of a MNOS memory device are illustrated in FIG. 2. If the gate electrode is maintained at ground and a negative pulse −V is applied to the substrate terminal S and the source and drain of the device are maintained at a voltage level −V, then the device is placed in the operating state represented by curve B of FIG. 2. After these voltages are removed, the memory device remains in this state and arbitrarily can be stated to represent storage of the bit 1. This 1 state is also the "clear" state of the memory element. If the gate electrode is placed at −V volts and the substrate, the source electrode and the drain are all placed at ground potential, the memory element is switched to the state represented by curve A. After these voltages are removed, the memory device remains in this same state, which arbitrarily can be said to represent storage of the bit 0.

In the operation of a memory such as shown in FIG. 1, to clear any row $w_i$ of the memory, it is necessary that the translator 10 apply to that row, in response to an input voltage at $d_i$ of −V, a voltage at ground level and concurrently that the substrate and all of the column conductors be at −V volts. Concurrently, the remaining rows of the memory must be maintained at −V volts to prevent the remaining rows from being cleared.

To write information into any row $w_i$ of the memory, the input at $d_i$ to a translator stage must be at a level −V and the corresponding word line $w_i$ must be at this same level −V. Concurrently, if it is desired to write a 0 into a particular bit location along that row, the two column conductors for that location must both be at ground potential, and if it is desired to write a 1 into a bit location in that row, the two column conductors for that location must be at a voltage level of −V. It is to be understood that writing a one into a memory element which is in the clear state involves not disturbing the state of that element.

In order to read the information stored in a row $w_i$, in response to a voltage −V at the input lead $d_i$ to the $i^{th}$ stage to the translator 10, that stage must produce an output voltage such as $-V_R$ of a value intermediate the voltage levels −V and 0, as shown in FIG. 2. In response to this voltage $-V_R$ and to a difference in potential such as −V (although this value is not critical and need not be as large as −V) between the source and drain of a memory element, if a memory element is in the 1 state (curve B), a substantial amount of source to drain current $I_R$ will pass through the source to drain path of the MNOS memory device and be conducted by the two column leads connected to that device. This current may be detected by a sense amplifier (not shown) connected to a pair of column conductors. If, on the other hand, the memory element is storing a 0, the source-to-drain current drawn by that memory device will be essentially zero as illustrated by operating point 18.

The operation described above is succinctly given in Table I below:

TABLE I

| Operation | Gate electrode | Substrate | $B_{j,1}$ | $B_{j,2}$ | Remarks |
|---|---|---|---|---|---|
| Clear | Ground | −V | −V | −V | Operate on curve B. |
| Write 0 | −V | Ground | Ground | Ground | Switch to curve A. |
| Write 1 | −V | do | −V | −V | Remain on curve B. |
| Read | Between 0 and −V | do | Ground | −V | For store 1, substantial $I_D$ current flow. For store 0: $I_D \cong 0$. |

Figure 3:
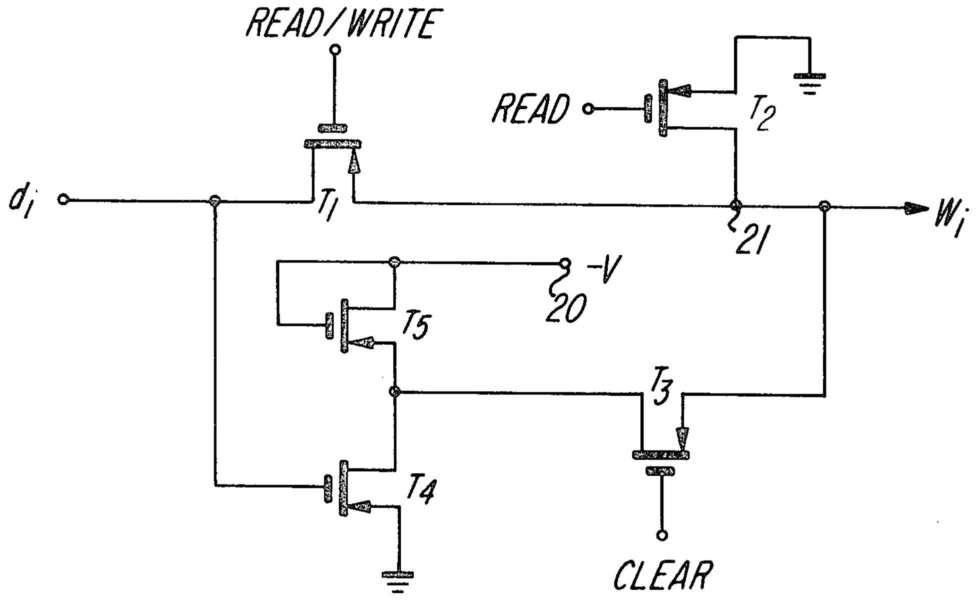
FIG. 3 is a schematic drawing of an embodiment of a voltage translation circuit in accordance with the present invention.

The circuit of FIG. 3 which includes all of the elements within one of the stages in the translating circuit 10, produces the desired memory operating voltages as described above. As already stated, there are n circuits such as shown in FIG. 3, one per stage of block 10, however, as they are identical, only one of them is discussed here. The circuit includes five P-type MOS transistors $T_1$ through $T_5$. Transistor $T_1$ is connected at its drain to the decoder output line $d_i$ and at its source to the drain of transistor $T_2$ and to the word line $w_i$. Transistor $T_2$ which in the present example has a substantially higher gain than transistor $T_1$, is connected at its source to ground. Transistor $T_3$ is connected at its source to the word line $w_i$ and at its drain to the common source drain connection of transistors $T_5$ and $T_4$, respectively. Transistor $T_4$ is connected at its source to ground and transistor $T_5$, which is connected to operate as a load resistor, is connected at its drain and gate to a source of operating voltage $-V$. Transistor $T_4$ is connected at its gate to the decoder line $d_i$.

The signals for controlling the operation of the translating stage of FIG. 3 are the read, write and clear signals. Each signal may have a value of $-V$ representing a 1 or of ground representing a 0. Only one of the three signals has the value $-V$ at one time. The read signal is applied to the gate electrode of transistors $T_1$ and $T_2$; the clear signal is applied to the gate electrode of transistor $T_3$; and the write signal is applied to the gate electrode of transistor $T_1$.

In the operation of the translating stage of FIG. 3, assume in each case that $d_i$ is at $-V$. This means, in other words, that the corresponding word line $w_i$ of the memory is the selected line and that the remaining decoder ($d$) lines are all at ground.

If it is desired to clear a row of the memory, the clear signal equals $-V$ and the read and write signals are at ground. In response to these signals, the conduction path of transistor $T_3$ assumes a low impedance condition. In response to the $-V$ signal at $d_i$, transistor $T_4$ is driven into conduction. Accordingly, there is a low impedance path from line $w_i$ to ground through transistors $T_3$ and $T_4$ and the word line $w_i$ is essentially at ground level. As can be seen from the table above, this is appropriate for the clear operation. It might be added, as also appears in the table above, that during the time the clear signal is present, all of the column conductors and substrates are pulsed at a level of $-V$ volts. This does not affect the remaining rows w of the memory because they are at $-V$ as will be shown shortly.

Assume now that it is desired to write a word of information into the word line $w_i$ of the memory. The decoder output $d_i$ is at $-V$, write is at $-V$ and read and clear are both at ground. In response to the clear signal which is at ground, transistor $T_3$ is cut off isolating the line $w_i$ from ground. The read signal at ground cuts off transistor $T_2$. In response to the $-V$ write signal, transistor $T_1$ is turned on and the $-V$ present at $d_i$ therefore appears on the word line $w_i$. Now for those memory locations along the selected word line $w_i$ where it is desired to write a 0, both of the column conductors of these locations are placed at ground. For those of the locations along the row which it is desired not change state, that is, for those it is desired to retain stored the bit 1, both column conductors are placed at $-V$. In all cases, the substrate is maintained at ground.

Assume now that it is desired to read the information stored in a row of the memory. Here $d_i$ is at $-V$, read is at $-V$, and write and clear are at ground. Each $B_{j,1}$ column is placed at ground and each $B_{j,2}$ column is placed at a voltage such as $-V$. The substrate is at ground. Transistor $T_3$ is cut off and transistors $T_1$ and $T_2$ are driven into conduction. As mentioned previously, in the example of the invention discussed, the transconductance of transistor $T_2$ is higher than that of $T_1$ to cause a voltage $-V_R$ (FIG. 2) to develop at the source to drain connection 21 of transistors $T_1$ and $T_2$. This voltage is intermediate $-V$ and 0 and is suitable for producing a flow of current in the source-to-drain path of those MNOS memory transistors storing a 1 and essentially no current flow in the source to drain paths of those memory transistors storing a 0.

While not intended to be limiting, for purposes of illustration various of the parameters of the circuit of FIG. 3 may be as follows:

Voltage $-V = -20$ volts
Transconductance of transistors $T_1, T_3, T_4 = 250$ $\mu$mhos
Transconductance of transistor $T_2 = 750$ $\mu$mhos
Transconductance of transistor $T_5 = 25$ $\mu$mhos
$-V_R = -5$ volts
$I_R = 0.5$ ma.

In general, the actual transconductance values will depend upon the particular circuit design. In the present example, the voltage at $d_i$ is $-20$ volts and the read voltage desired is $-5$ volts so that the resistance of $T_1$ when conducting should be three times that of $T_2$ when conducting. For other values of $-V$ and $-V_R$, different values of transconductance may be chosen for $T_1$ and $T_2$ to provide the desired voltage-divider action, considering the two conduction paths to operate as series connected resistors. Note that since the line $w_i$ is connected to gate electrodes of the memory elements, it exhibits a high impedance and has little effect on the value of $-V_R$.

Some important features of the circuit of FIG. 3 are that it is relatively simple and may be integrated onto the same substrate as the memory 16.

Table II below describes the operation of the circuit of FIG. 3 both when $d_i = -V$ and when $d_i =$ ground.

TABLE II

| Clear | Write | Read | $d_i$ | $w_i$ | Remarks |
|---|---|---|---|---|---|
| $-V$ | Ground | Ground | $-V$ | Ground | Clear |
| | | | Ground | $-V$ | Operation |
| Ground | $-V$ | Ground | $-V$ | $-V$ | Write |
| | | | Ground | Ground | Operation |
| Ground | Ground | $-V$ | $-V$ | Between ground&$-V$ | Read Operation |
| | | | Ground | Ground | |

Note that when $d_i =$ ground and clear $= -V$, the $-V$ voltage present at terminal 20 is conducted through transistor $T_5$ and transistor $T_3$ to the word line $w_i$. This is a non-selected condition of the word line and the voltage $-V$ applied to the gate electrodes of the MNOS transistors connected to the non-selected word lines prevents these transistors from changing state when another row of the memory (the selected row) is being cleared.

While the invention is illustrated as implemented by P-type transistors, it is to be understood that N-type may be used instead, provided appropriate operating voltages are employed. It is also to be understood that the decoding levels chosen for purposes of illustration are purely arbitrary and that, for example, one $d$ line may be at ground and all other d lines at some given voltage level (either positive or negative) provided appropriate translating stages and memory elements are employed.

The theory of operation of MNOS devices is discussed only briefly herein. A more detailed expostion may be found in E. C. Ross and J. T. Wallmark, "Theory of the Switching Behavior of MIS Memory Transistors," RCA Review, Vol. 30, No. 2., 366–381, June 1969.

What is claimed is:

1. In combination;

an input terminal and an output terminal;

means for applying to said input terminal a voltage which is at one of two levels;

means responsive to a first control voltage for providing a low impedance path between said two terminals;

means responsive to the presence of a second control voltage and the absence of said first control voltage for applying the complement of the voltage present at said input terminal to said output terminal and for opening said low impedance path; and means responsive to a third control voltage and the absence of said first and second control voltages for providing a first conduction path between said terminals and a second conduction path between said output terminal and a point of reference potential.

2. In the combination as set forth in claim 1, said first and second conduction paths each comprising the conduction path of a field-effect transistor and each exhibiting a different resistance.

3. In the combination as set forth in claim 1, said means responsive to the presence of said second control voltage and the absence of said first control voltage comprising:

two field-effect transistors the conduction paths of which are connected in series between said output terminal and a point of reference potential, the first said transistor being directly connected to said output terminal and whose conduction path is placed in a low impedance condition in response to the presence of said second control voltage and the second said transistor having a conduction path whose impedance is responsive to the value of the signal present at said input terminal, being relatively high when said signal is of one value and being relatively low when said signal is at its other value; and a voltage source of value approximately equal to the level at said input terminal which places said second transistor in a low impedance condition, connected to the connection between the conduction paths of said first and second transistors.

4. In combination;

a first switch which exhibits a given resistance when it conducts connected between an input terminal and an output terminal;

a second switch which exhibits a relatively lower resistance when it conducts, connected between said output terminal and ground;

a third switch which exhibits said given resistance when it conducts connected between a terminal for receiving an operating voltage and said output terminal;

a fourth switch which exhibits said given resistance when it conducts controlled by the voltage present on said input terminal and connected between said terminal for said operating voltage and ground; and means for causing said switches to assume the following states:

1. the first switch closed and the second and third switches open;
2. the first and second switches closed and the third switch open; and
3. the third switch closed and the first and second switches open.

5. In combination:

a first field-effect transistor the conduction path of which is connected between an input terminal and an output terminal;

a second field-effect transistor of substantially higher gain than the first, the conduction path of which is connected between said output terminal and ground;

a third field-effect transistor the conduction path of which is connected between said output terminal and a source of operating potential;

a fourth field-effect transistor the conduction path of which is connected between said source of operating potential and ground;

means for placing the conduction path of said first transistor in its low impedance condition while the conduction paths of the second and third transistors are in their high impedance state;

means for concurrently placing the conduction paths of said first and second transistors in their low impedance condition while the conduction path of said third transistor is in its high impedance state; and means for placing the conduction path of said third transistor in its low impedance condition while the conduction paths of said first and second transistors are in their high impedance condition and concurrently controlling the impedance of the conduction path of said fourth transistor in response to the voltage present at said input terminal.

* * * * *